United States Patent
Bloom

[11] Patent Number: 6,130,770
[45] Date of Patent: Oct. 10, 2000

[54] ELECTRON GUN ACTIVATED GRATING LIGHT VALVE

[75] Inventor: David M. Bloom, Palo Alto, Calif.

[73] Assignee: Silicon Light Machines, Sunnyavle, Calif.

[21] Appl. No.: 09/103,285

[22] Filed: Jun. 23, 1998

[51] Int. Cl.[7] .............................. G02B 26/00; G02B 5/18
[52] U.S. Cl. .................... 359/224; 359/231; 359/290; 359/293; 359/572; 359/573; 359/900
[58] Field of Search .................... 359/573, 223, 359/224, 225, 226, 290, 291, 292, 293, 566, 567, 572, 231, 230, 900

[56] References Cited

U.S. PATENT DOCUMENTS

| | | | |
|---|---|---|---|
| Re. 16,767 | 10/1927 | Jenkins . | |
| Re. 25,169 | 5/1962 | Glenn . | |
| 1,525,550 | 2/1925 | Jenkins . | |
| 1,548,262 | 8/1925 | Freedman . | |
| 1,814,701 | 7/1931 | Ives . | |
| 2,415,226 | 2/1947 | Sziklai | 178/5.4 |
| 2,783,406 | 2/1957 | Vanderhooft | 313/70 |
| 2,991,690 | 7/1961 | Grey et al. | 88/16.6 |
| 3,553,364 | 1/1971 | Lee | 178/7.3 |
| 3,576,394 | 4/1971 | Lee | 178/7.3 |
| 3,600,798 | 8/1971 | Lee | 29/592 |
| 3,656,837 | 4/1972 | Sandbank | 350/161 |
| 3,781,465 | 12/1973 | Ernstoff et al. | 178/5.4 BD |
| 3,783,184 | 1/1974 | Ernstoff et al. | 178/5.4 BD |
| 3,802,769 | 4/1974 | Rotz et al. | 352/43 |
| 3,862,360 | 1/1975 | Dill et al. | 178/7.3 D |
| 3,886,310 | 5/1975 | Guldberg et al. | 178/7.5 D |
| 3,896,338 | 7/1975 | Nathanson et al. | 315/373 |
| 3,915,548 | 10/1975 | Opittek et al. | 350/3.5 |

(List continued on next page.)

FOREIGN PATENT DOCUMENTS

| | | | |
|---|---|---|---|
| 0 261 901 A2 | 3/1988 | European Pat. Off. | G09G 3/36 |
| 0 306 308 A2 | 3/1989 | European Pat. Off. | H04N 3/14 |
| 0 627 644 A3 | 9/1990 | European Pat. Off. | G02B 27/00 |
| 0 417 039 A1 | 3/1991 | European Pat. Off. | G03B 21/20 |

(List continued on next page.)

OTHER PUBLICATIONS

Russick et al., "Supercritical Carbon Dioxide Extraction of Solvent from Micromachined Structures," Supercritical Fluids, Chapter 18, pp 255–269, 1997.

Bühler et al., "Linear Array of Complementary Metal Oxide Semiconductor Double–Pass Metal Micromirrors," Optical Engineering, vol. 36, No. 5, pp 1391–1398, May 1997.

(List continued on next page.)

*Primary Examiner*—Cassandra Spyrou
*Assistant Examiner*—John Juba, Jr.
*Attorney, Agent, or Firm*—Haverstock & Owens LLP

[57] ABSTRACT

A grating light valve is configured to either reflect or diffract an incident beam of light from a light source. Each grating light valve includes a plurality of deformable reflective ribbon structures. Preferably, the grating light valve is located within a vacuum chamber. A directable low power electron gun is also positioned within the chamber. To form an image the gun is scanned across an array of grating light valves and selectably irradiates predetermined ones of the ribbons to charge each such ribbon to a predetermined level. Depending upon the amount of charge so deposited onto the ribbon, it will deflect a predetermined distance toward an underlying substrate. The ribbons are preferably erased in one of two ways. According to the preferred embodiment, each ribbon includes a path of impedance to allow the charge to bleed into the substrate. The impedance is selected to discharge a fully charged ribbon in a period of a single frame. Alternatively, the electron gun can be used to generate high energy electrons. Upon impinging a ribbon a single high energy electron will cause the ribbon to emit more than one secondary electron. By applying a sufficient number of these high energy electrons, the charge on a ribbon can be removed.

19 Claims, 7 Drawing Sheets

U.S. PATENT DOCUMENTS

| | | | |
|---|---|---|---|
| 3,935,499 | 1/1976 | Oess | 313/413 |
| 3,935,500 | 1/1976 | Oess et al. | 313/495 |
| 3,943,281 | 3/1976 | Keller et al. | 178/7.5 D |
| 3,947,105 | 3/1976 | Smith | 353/121 |
| 3,969,611 | 7/1976 | Fonteneau | 219/502 |
| 3,991,416 | 11/1976 | Byles et al. | 340/324 R |
| 4,001,663 | 1/1977 | Bray | 321/2 |
| 4,006,968 | 2/1977 | Ernstoff et al. | 350/160 LC |
| 4,009,939 | 3/1977 | Okano | 350/162 SF |
| 4,012,116 | 3/1977 | Yevick | 350/132 |
| 4,017,158 | 4/1977 | Booth | 350/162 SF |
| 4,020,381 | 4/1977 | Oess et al. | 313/302 |
| 4,067,129 | 1/1978 | Abramson et al. | 40/563 |
| 4,084,437 | 4/1978 | Finnegan | 73/361 |
| 4,090,219 | 5/1978 | Ernstoff et al. | 358/59 |
| 4,093,346 | 6/1978 | Nishino et al. | 350/162 SF |
| 4,093,921 | 6/1978 | Buss | 325/459 |
| 4,093,922 | 6/1978 | Buss | 325/459 |
| 4,100,579 | 7/1978 | Ernstoff | 358/230 |
| 4,127,322 | 11/1978 | Jacobson et al. | 353/31 |
| 4,135,502 | 1/1979 | Peck | 128/76.5 |
| 4,139,257 | 2/1979 | Matsumoto | 350/6.1 |
| 4,163,570 | 8/1979 | Greenaway | 283/8 A |
| 4,184,700 | 1/1980 | Greenaway | 283/6 |
| 4,185,891 | 1/1980 | Kaestner | 372/9 |
| 4,195,915 | 4/1980 | Lichty et al. | 350/345 |
| 4,205,428 | 6/1980 | Ernstoff et al. | 29/592 R |
| 4,211,918 | 7/1980 | Nyfeler et al. | 235/454 |
| 4,223,050 | 9/1980 | Nyfeler et al. | 427/163 |
| 4,225,913 | 9/1980 | Bray | 363/97 |
| 4,250,217 | 2/1981 | Greenaway | 428/161 |
| 4,250,393 | 2/1981 | Greenaway | 250/566 |
| 4,256,787 | 3/1981 | Shaver et al. | 428/1 |
| 4,311,999 | 1/1982 | Upton et al. | 340/755 |
| 4,327,411 | 4/1982 | Turner | 364/900 |
| 4,327,966 | 5/1982 | Bloom | 350/162 R |
| 4,338,660 | 7/1982 | Kelley et al. | 364/200 |
| 4,343,535 | 8/1982 | Bleha, Jr. | 350/342 |
| 4,361,384 | 11/1982 | Bosserman | 350/174 |
| 4,374,397 | 2/1983 | Mir | 358/75 |
| 4,389,096 | 6/1983 | Hori et al. | 350/339 R |
| 4,408,884 | 10/1983 | Kleinknecht et al. | 356/355 |
| 4,418,397 | 11/1983 | Brantingham et al. | 364/900 |
| 4,420,717 | 12/1983 | Wallace et al. | 318/696 |
| 4,430,584 | 2/1984 | Someshwar et al. | 307/465 |
| 4,440,839 | 4/1984 | Mottier | 430/2 |
| 4,443,819 | 4/1984 | Funada et al. | 358/236 |
| 4,443,845 | 4/1984 | Hamilton et al. | 364/200 |
| 4,447,881 | 5/1984 | Brantingham et al. | 364/488 |
| 4,454,591 | 6/1984 | Lou | 364/900 |
| 4,468,725 | 8/1984 | Venturini | 363/160 |
| 4,484,188 | 11/1984 | Ott | 340/728 |
| 4,492,435 | 1/1985 | Banton et al. | 350/360 |
| 4,503,494 | 3/1985 | Hamilton et al. | 364/200 |
| 4,556,378 | 12/1985 | Nyfeler et al. | 425/143 |
| 4,561,044 | 12/1985 | Ogura et al. | 362/84 |
| 4,566,935 | 1/1986 | Hornbeck | 156/626 |
| 4,571,041 | 2/1986 | Gaudyn | 353/10 |
| 4,571,603 | 2/1986 | Hornbeck et al. | 346/160 |
| 4,590,548 | 5/1986 | Maytum | 363/161 |
| 4,594,501 | 6/1986 | Culley et al. | 219/492 |
| 4,596,992 | 6/1986 | Hornbeck | 346/76 PH |
| 4,615,595 | 10/1986 | Hornbeck | 353/122 |
| 4,623,219 | 11/1986 | Trias | 350/351 |
| 4,636,866 | 1/1987 | Hattori | 358/236 |
| 4,645,881 | 2/1987 | LeToumelin et al. | 379/252 |
| 4,646,158 | 2/1987 | Ohno et al. | 358/236 |
| 4,652,932 | 3/1987 | Miyajima et al. | 358/236 |
| 4,655,539 | 4/1987 | Caulfield et al. | 350/3.6 |
| 4,662,746 | 5/1987 | Hornbeck | 350/269 |
| 4,663,670 | 5/1987 | Ito et al. | 358/245 |
| 4,687,326 | 8/1987 | Corby, Jr. | 356/5 |
| 4,698,602 | 10/1987 | Armitage | 359/294 |
| 4,709,995 | 12/1987 | Kuribayashi et al. | 350/350 S |
| 4,710,732 | 12/1987 | Hornbeck | 332/7.51 |
| 4,714,326 | 12/1987 | Usui et al. | 350/485 |
| 4,719,507 | 1/1988 | Bos | 358/92 |
| 4,722,593 | 2/1988 | Shimazaki | 350/336 |
| 4,728,185 | 3/1988 | Thomas | 353/122 |
| 4,744,633 | 5/1988 | Sheiman | 350/132 |
| 4,747,671 | 5/1988 | Takahashi et al. | 3501/132 |
| 4,751,509 | 6/1988 | Kubota et al. | 340/784 |
| 4,761,253 | 8/1988 | Antes | 264/1.3 |
| 4,772,094 | 9/1988 | Sheiman | 350/133 |
| 4,797,694 | 1/1989 | Agostinelli et al. | 346/160 |
| 4,801,194 | 1/1989 | Agostinelli et al. | 350/356 |
| 4,803,560 | 2/1989 | Matsunaga et al. | 358/236 |
| 4,807,965 | 2/1989 | Garakani | 350/131 |
| 4,809,078 | 2/1989 | Yabe et al. | 358/236 |
| 4,811,210 | 3/1989 | McAulay | 364/200 |
| 4,814,759 | 3/1989 | Gombrich et al. | 340/771 |
| 4,827,391 | 5/1989 | Sills | 363/41 |
| 4,829,365 | 5/1989 | Eichenlaub | 358/3 |
| 4,856,863 | 8/1989 | Sampsell et al. | 350/96.16 |
| 4,856,869 | 8/1989 | Sakata et al. | 350/162.18 |
| 4,859,012 | 8/1989 | Cohn | 350/96.24 |
| 4,866,488 | 9/1989 | Frensley | 357/4 |
| 4,915,463 | 4/1990 | Barbee, Jr. | 350/1.1 |
| 4,915,479 | 4/1990 | Clarke | 350/345 |
| 4,934,773 | 6/1990 | Becker | 350/6.6 |
| 4,952,925 | 8/1990 | Haastert | 340/784 |
| 4,954,789 | 9/1990 | Sampsell | 330/4.3 |
| 4,956,619 | 9/1990 | Hornbeck | 330/4.3 |
| 4,978,202 | 12/1990 | Yang | 350/331 R |
| 4,982,184 | 1/1991 | Kirkwood | 340/783 |
| 4,984,824 | 1/1991 | Antes et al. | 283/91 |
| 5,003,300 | 3/1991 | Wells | 340/705 |
| 5,013,141 | 5/1991 | Sakata | 350/348 |
| 5,018,256 | 5/1991 | Hornbeck | 29/25.01 |
| 5,022,750 | 6/1991 | Flasck | 353/31 |
| 5,024,494 | 6/1991 | Williams et al. | 350/3.6 |
| 5,028,939 | 7/1991 | Hornbeck et al. | 346/160 |
| 5,035,473 | 7/1991 | Kuwayama et al. | 350/3.7 |
| 5,037,173 | 8/1991 | Sampsell et al. | 385/17 |
| 5,041,851 | 8/1991 | Nelson | 346/160 |
| 5,048,077 | 9/1991 | Wells et al. | 379/96 |
| 5,058,992 | 10/1991 | Takahashi | 359/567 |
| 5,060,058 | 10/1991 | Goldenberg et al. | 358/60 |
| 5,061,049 | 10/1991 | Hornbeck | 359/224 |
| 5,072,239 | 12/1991 | Mitcham et al. | 346/108 |
| 5,072,418 | 12/1991 | Boutaud et al. | 364/715.06 |
| 5,079,544 | 1/1992 | DeMond et al. | 340/701 |
| 5,083,857 | 1/1992 | Hornbeck | 359/291 |
| 5,089,903 | 2/1992 | Kuwayama et al. | 359/15 |
| 5,096,279 | 3/1992 | Hornbeck et al. | 359/230 |
| 5,099,353 | 3/1992 | Hornbeck | 359/291 |
| 5,101,184 | 3/1992 | Antes | 235/454 |
| 5,101,236 | 3/1992 | Nelson et al. | 355/229 |
| 5,105,207 | 4/1992 | Nelson | 346/160 |
| 5,105,299 | 4/1992 | Anderson et al. | 359/223 |
| 5,105,369 | 4/1992 | Nelson | 364/525 |
| 5,113,272 | 5/1992 | Reamey | 359/53 |
| 5,113,285 | 5/1992 | Franklin et al. | 359/465 |
| 5,119,204 | 6/1992 | Hashimoto et al. | 358/254 |
| 5,121,343 | 6/1992 | Faris | 395/111 |
| 5,128,660 | 7/1992 | DeMond et al. | 340/707 |
| 5,129,716 | 7/1992 | Holakovszky et al. | 351/50 |
| 5,132,812 | 7/1992 | Takahashi et al. | 359/9 |
| 5,142,303 | 8/1992 | Nelson | 346/108 |
| 5,142,405 | 8/1992 | Hornbeck | 359/226 |
| 5,142,677 | 8/1992 | Ehlig et al. | 395/650 |
| 5,148,157 | 9/1992 | Florence | 340/783 |

| Patent | Date | Inventor | Class |
|---|---|---|---|
| 5,148,506 | 9/1992 | McDonald | 385/16 |
| 5,151,718 | 9/1992 | Nelson | 346/160 |
| 5,155,604 | 10/1992 | Miekka et al. | 359/2 |
| 5,155,615 | 10/1992 | Tagawa | 359/213 |
| 5,155,778 | 10/1992 | Magel et al. | 385/18 |
| 5,155,812 | 10/1992 | Ehlig et al. | 395/275 |
| 5,159,485 | 10/1992 | Nelson | 359/291 |
| 5,161,042 | 11/1992 | Hamada | 359/41 |
| 5,162,787 | 11/1992 | Thompson et al. | 340/794 |
| 5,165,013 | 11/1992 | Faris | 395/104 |
| 5,168,406 | 12/1992 | Nelson | 359/855 |
| 5,170,156 | 12/1992 | DeMond et al. | 340/794 |
| 5,170,269 | 12/1992 | Lin et al. | 359/9 |
| 5,170,283 | 12/1992 | O'Brien et al. | 359/291 |
| 5,172,161 | 12/1992 | Nelson | 355/200 |
| 5,172,262 | 12/1992 | Hornbeck | 359/223 |
| 5,178,728 | 1/1993 | Boysel et al. | 156/656 |
| 5,179,274 | 1/1993 | Sampsell | 250/208.2 |
| 5,179,367 | 1/1993 | Shimizu | 340/700 |
| 5,181,231 | 1/1993 | Parikh et al. | 377/26 |
| 5,182,665 | 1/1993 | O'Callaghan et al. | 359/95 |
| 5,192,864 | 3/1993 | McEwen et al. | 250/234 |
| 5,192,946 | 3/1993 | Thompson et al. | 340/794 |
| 5,202,785 | 4/1993 | Nelson | 359/214 |
| 5,206,629 | 4/1993 | DeMond et al. | 340/719 |
| 5,212,555 | 5/1993 | Stoltz | 358/206 |
| 5,212,582 | 5/1993 | Nelson | 359/224 |
| 5,214,419 | 5/1993 | DeMond et al. | 340/794 |
| 5,214,420 | 5/1993 | Thompson et al. | 340/795 |
| 5,216,537 | 6/1993 | Hornbeck | 359/291 |
| 5,221,982 | 6/1993 | Faris | 359/93 |
| 5,226,099 | 7/1993 | Mignardi et al. | 385/19 |
| 5,231,363 | 7/1993 | Sano et al. | 332/109 |
| 5,231,388 | 7/1993 | Stoltz | 340/783 |
| 5,231,432 | 7/1993 | Glenn | 353/31 |
| 5,233,456 | 8/1993 | Nelson | 359/214 |
| 5,237,340 | 8/1993 | Nelson | 346/108 |
| 5,237,435 | 8/1993 | Kurematsu et al. | 359/41 |
| 5,240,818 | 8/1993 | Mignardi et al. | 430/321 |
| 5,245,686 | 9/1993 | Faris et al. | 385/120 |
| 5,247,180 | 9/1993 | Mitcham et al. | 250/492.1 |
| 5,247,593 | 9/1993 | Lin et al. | 385/17 |
| 5,254,980 | 10/1993 | Hendrix et al. | 345/84 |
| 5,255,100 | 10/1993 | Urbanus | 358/231 |
| 5,256,869 | 10/1993 | Lin et al. | 250/201.9 |
| 5,262,000 | 11/1993 | Wellbourn et al. | 156/643 |
| 5,272,473 | 12/1993 | Thompson et al. | 345/7 |
| 5,278,652 | 1/1994 | Urbanus et al. | 358/160 |
| 5,278,925 | 1/1994 | Boysel et al. | 385/14 |
| 5,280,277 | 1/1994 | Hornbeck | 345/108 |
| 5,281,887 | 1/1994 | Engle | 359/224 |
| 5,281,957 | 1/1994 | Schoolman | 345/8 |
| 5,285,196 | 2/1994 | Gale, Jr. | 345/108 |
| 5,285,407 | 2/1994 | Gale et al. | 365/189.11 |
| 5,287,096 | 2/1994 | Thompson et al. | 345/147 |
| 5,287,215 | 2/1994 | Warde et al. | 359/293 |
| 5,289,172 | 2/1994 | Gale, Jr. et al. | 345/108 |
| 5,291,317 | 3/1994 | Newswanger | 359/15 |
| 5,291,473 | 3/1994 | Pauli | 369/112 |
| 5,293,511 | 3/1994 | Poradish et al. | 257/434 |
| 5,296,891 | 3/1994 | Vogt et al. | 355/67 |
| 5,296,950 | 3/1994 | Lin et al. | 359/9 |
| 5,299,037 | 3/1994 | Sakata | 359/41 |
| 5,299,289 | 3/1994 | Omae et al. | 359/95 |
| 5,301,062 | 4/1994 | Takahashi et al. | 359/567 |
| 5,303,055 | 4/1994 | Hendrix et al. | 348/761 |
| 5,307,056 | 4/1994 | Urbanus | 340/189 |
| 5,307,185 | 4/1994 | Jones et al. | 359/41 |
| 5,311,349 | 5/1994 | Anderson et al. | 359/223 |
| 5,311,360 | 5/1994 | Bloom et al. | 359/572 |
| 5,312,513 | 5/1994 | Florence et al. | 156/643 |
| 5,313,479 | 5/1994 | Florence | 372/26 |
| 5,313,648 | 5/1994 | Ehlig et al. | 395/800 |
| 5,315,418 | 5/1994 | Sprague et al. | 359/41 |
| 5,319,214 | 6/1994 | Gregory et al. | 250/504 R |
| 5,319,789 | 6/1994 | Ehlig et al. | 395/800 |
| 5,319,792 | 6/1994 | Ehlig et al. | 395/800 |
| 5,321,416 | 6/1994 | Bassett et al. | 345/8 |
| 5,323,002 | 6/1994 | Sampsell et al. | 250/252.1 |
| 5,325,116 | 6/1994 | Sampsell | 346/108 |
| 5,327,286 | 7/1994 | Sampsell et al. | 359/561 |
| 5,330,878 | 7/1994 | Nelson | 430/311 |
| 5,331,454 | 7/1994 | Hornbeck | 359/224 |
| 5,339,116 | 8/1994 | Urbanus et al. | 348/716 |
| 5,339,177 | 8/1994 | Jenkins et al. | 359/35 |
| 5,345,521 | 9/1994 | McDonald et al. | 385/19 |
| 5,347,321 | 9/1994 | Gove | 348/663 |
| 5,347,378 | 9/1994 | Handschy et al. | 359/53 |
| 5,347,433 | 9/1994 | Sedlmayr | 362/32 |
| 5,348,619 | 9/1994 | Bohannon et al. | 156/664 |
| 5,349,687 | 9/1994 | Ehlig et al. | 395/800 |
| 5,351,052 | 9/1994 | D'Hont et al. | 342/42 |
| 5,357,369 | 10/1994 | Pilling et al. | 359/462 |
| 5,359,349 | 10/1994 | Jambor et al. | 345/168 |
| 5,363,220 | 11/1994 | Kuwayama et al. | 359/3 |
| 5,365,283 | 11/1994 | Doherty et al. | 348/743 |
| 5,367,585 | 11/1994 | Ghezzo et al. | 385/23 |
| 5,371,543 | 12/1994 | Anderson | 348/270 |
| 5,371,618 | 12/1994 | Tai et al. | 359/53 |
| 5,382,961 | 1/1995 | Gale, Jr. | 345/108 |
| 5,387,924 | 2/1995 | Gale, Jr. et al. | 345/108 |
| 5,389,182 | 2/1995 | Mignardi | 156/344 |
| 5,392,140 | 2/1995 | Ezra et al. | 359/41 |
| 5,392,151 | 2/1995 | Nelson | 359/223 |
| 5,398,071 | 3/1995 | Gove et al. | 348/558 |
| 5,404,485 | 4/1995 | Ban | 395/425 |
| 5,410,315 | 4/1995 | Huber | 342/42 |
| 5,411,769 | 5/1995 | Hornbeck | 427/534 |
| 5,412,186 | 5/1995 | Gale | 219/679 |
| 5,418,584 | 5/1995 | Larson | 353/122 |
| 5,420,655 | 5/1995 | Shimizu | 353/33 |
| 5,430,524 | 7/1995 | Nelson | 355/200 |
| 5,435,876 | 7/1995 | Alfaro et al. | 156/247 |
| 5,442,411 | 8/1995 | Urbanus et al. | 348/771 |
| 5,442,414 | 8/1995 | Janssen et al. | 353/98 |
| 5,444,566 | 8/1995 | Gale et al. | 359/291 |
| 5,445,559 | 8/1995 | Gale et al. | 451/388 |
| 5,446,479 | 8/1995 | Thompson et al. | 345/139 |
| 5,447,600 | 9/1995 | Webb | 216/2 |
| 5,448,314 | 9/1995 | Heimbuch et al. | 348/743 |
| 5,448,546 | 9/1995 | Pauli | 369/112 |
| 5,450,088 | 9/1995 | Meier et al. | 342/51 |
| 5,450,219 | 9/1995 | Gold et al. | 359/40 |
| 5,451,103 | 9/1995 | Hatanaka et al. | 353/31 |
| 5,452,024 | 9/1995 | Sampsell | 348/755 |
| 5,452,138 | 9/1995 | Mignardi et al. | 359/855 |
| 5,453,747 | 9/1995 | D'Hont et al. | 342/42 |
| 5,453,778 | 9/1995 | Venkateswar et al. | 347/239 |
| 5,453,803 | 9/1995 | Shapiro et al. | 353/119 |
| 5,454,906 | 10/1995 | Baker et al. | 216/66 |
| 5,455,602 | 10/1995 | Tew | 347/239 |
| 5,457,493 | 10/1995 | Leddy et al. | 348/164 |
| 5,457,566 | 10/1995 | Sampsell et al. | 359/292 |
| 5,458,716 | 10/1995 | Alfaro et al. | 156/245 |
| 5,459,492 | 10/1995 | Venkateswar | 347/253 |
| 5,459,528 | 10/1995 | Pettitt | 348/568 |
| 5,459,592 | 10/1995 | Shibatani et al. | 359/40 |
| 5,459,610 | 10/1995 | Bloom et al. | 359/572 |
| 5,461,410 | 10/1995 | Venkateswar et al. | 347/240 |
| 5,461,411 | 10/1995 | Florence et al. | 347/240 |
| 5,461,547 | 10/1995 | Ciupke et al. | 362/31 |
| 5,463,347 | 10/1995 | Jones et al. | 330/253 |
| 5,465,175 | 11/1995 | Woodgate et al. | 359/463 |
| 5,467,106 | 11/1995 | Salomon | 345/87 |

| | | | |
|---|---|---|---|
| 5,467,138 | 11/1995 | Gove | 348/452 |
| 5,467,146 | 11/1995 | Huang et al. | 348/743 |
| 5,469,302 | 11/1995 | Lim | 359/846 |
| 5,471,341 | 11/1995 | Warde et al. | 359/293 |
| 5,481,118 | 1/1996 | Tew | 250/551 |
| 5,482,564 | 1/1996 | Douglas et al. | 134/18 |
| 5,482,818 | 1/1996 | Nelson | 430/394 |
| 5,483,307 | 1/1996 | Anderson | 353/98 |
| 5,485,172 | 1/1996 | Sawachika et al. | 345/8 |
| 5,485,304 | 1/1996 | Kaeriyama | 359/291 |
| 5,485,354 | 1/1996 | Ciupke et al. | 362/31 |
| 5,486,698 | 1/1996 | Hanson et al. | 250/332 |
| 5,486,841 | 1/1996 | Hara et al. | 345/8 |
| 5,486,946 | 1/1996 | Jachimowicz et al. | 359/263 |
| 5,488,431 | 1/1996 | Gove et al. | 348/716 |
| 5,489,952 | 2/1996 | Gove et al. | 348/771 |
| 5,490,009 | 2/1996 | Venkateswar et al. | 359/291 |
| 5,491,510 | 2/1996 | Gove | 348/77 |
| 5,491,715 | 2/1996 | Flaxl | 375/344 |
| 5,497,172 | 3/1996 | Doherty et al. | 345/85 |
| 5,497,197 | 3/1996 | Gove et al. | 348/388 |
| 5,497,262 | 3/1996 | Kaeriyama | 359/223 |
| 5,499,060 | 3/1996 | Gove et al. | 348/651 |
| 5,499,062 | 3/1996 | Urbanus | 348/771 |
| 5,500,761 | 3/1996 | Goossen et al. | 359/290 |
| 5,502,481 | 3/1996 | Dentinger et al. | 348/51 |
| 5,504,504 | 4/1996 | Markandey et al. | 345/214 |
| 5,504,514 | 4/1996 | Nelson | 347/130 |
| 5,504,575 | 4/1996 | Stafford | 356/330 |
| 5,504,614 | 4/1996 | Webb et al. | 359/223 |
| 5,506,171 | 4/1996 | Leonard et al. | 437/187 |
| 5,506,597 | 4/1996 | Thompson et al. | 345/85 |
| 5,506,720 | 4/1996 | Yoon | 359/224 |
| 5,508,750 | 4/1996 | Hewlett et al. | 348/558 |
| 5,508,840 | 4/1996 | Vogel et al. | 359/291 |
| 5,508,841 | 4/1996 | Lin et al. | 359/318 |
| 5,510,824 | 4/1996 | Nelson | 347/239 |
| 5,512,374 | 4/1996 | Wallace et al. | 428/422 |
| 5,512,748 | 4/1996 | Hanson | 250/332 |
| 5,515,076 | 5/1996 | Thompson et al. | 345/139 |
| 5,516,125 | 5/1996 | McKenna | 279/3 |
| 5,517,340 | 5/1996 | Doany et al. | 359/41 |
| 5,517,347 | 5/1996 | Sampsell | 359/224 |
| 5,517,359 | 5/1996 | Gelbart | 359/623 |
| 5,519,450 | 5/1996 | Urbanus et al. | 348/600 |
| 5,521,748 | 5/1996 | Sarraf | 359/321 |
| 5,523,803 | 6/1996 | Urbanus et al. | 348/771 |
| 5,523,878 | 6/1996 | Wallace et al. | 359/290 |
| 5,523,881 | 6/1996 | Florence et al. | 359/561 |
| 5,524,155 | 6/1996 | Weaver | 385/24 |
| 5,539,422 | 7/1996 | Heacock et al. | 345/8 |
| 5,623,361 | 4/1997 | Engle | 359/291 |
| 5,668,611 | 9/1997 | Ernstoff et al. | 348/771 |
| 5,742,373 | 4/1998 | Alvelda | 349/204 |
| 5,757,536 | 5/1998 | Ricco et al. | 359/224 |
| 5,768,009 | 6/1998 | Little | 359/293 |
| 5,926,309 | 7/1999 | Little | 359/293 |

FOREIGN PATENT DOCUMENTS

| | | | |
|---|---|---|---|
| 0 488 326 A3 | 6/1992 | European Pat. Off. | G09G 3/28 |
| 0 528 646 A1 | 2/1993 | European Pat. Off. | G09G 3/02 |
| 0 530 760 A2 | 3/1993 | European Pat. Off. | G09G 3/34 |
| 0 550 189 A1 | 7/1993 | European Pat. Off. | G02F 1/315 |
| 0 610 665 A1 | 8/1994 | European Pat. Off. | G09G 3/34 |
| 0 627 644 A2 | 12/1994 | European Pat. Off. | G02B 27/00 |
| 0 627 850 A1 | 12/1994 | European Pat. Off. | H04N 5/64 |
| 0 643 314 A2 | 3/1995 | European Pat. Off. | G02B 27/00 |
| 0 654 777 A1 | 5/1995 | European Pat. Off. | G09G 3/34 |
| 0 658 868 A1 | 6/1995 | European Pat. Off. | G09G 3/34 |
| 0 689 078 A1 | 12/1995 | European Pat. Off. | G03B 26/08 |
| 0 801 319 A1 | 10/1997 | European Pat. Off. | G03B 26/00 |
| 63-305323 | 12/1988 | Japan | G02F 1/13 |
| 2-219092 | 8/1990 | Japan | G09G 3/28 |
| 2 118 365 | 10/1983 | United Kingdom | H01L 27/13 |
| 2 266 385 | 10/1993 | United Kingdom | G02B 23/10 |
| WO 92/12506 | 7/1992 | WIPO | G09F 9/37 |
| WO 93/02269 | 2/1993 | WIPO | E06B 5/10 |
| WO 93/09472 | 5/1993 | WIPO | G03F 7/20 |
| WO 93/18428 | 9/1993 | WIPO | G02B 27/00 |
| WO 95/11473 | 4/1995 | WIPO | G02B 27/00 |
| WO 96/41217 | 12/1996 | WIPO | G02B 5/18 |
| WO 96/41224 | 12/1996 | WIPO | G02B 19/00 |
| WO 97/26569 | 7/1997 | WIPO | G02B 5/18 |

OTHER PUBLICATIONS

Gani et al., "Variable Gratings for Optical Switching: Rigorous Electromagnetic Simulation and Design." Optical Engineering, vol. 38, No. 3, pp 552–557, Mar. 1999.

R. N. Thomas, et al., "The Mirror–Matrix Tube: A Novel Light Valve for Projection Displays", IEEE Trans. Electron. Dev., vol. ED–22, No. 9, pp. 765–775, Sep. 1975.

J. Guldberg, et al., "An Aluminum/Sio2/Silicon–on–Sapphire Light Valve Matrix fro Projection Displays", Appl. Phy. Lett., vol. 26, No. 7, pp. 391–393, Apr. 1975.

T. Iwai et al., "Real–time Profiling of a Pure Phase Object Using an Auto–Wigner Distribution Function," Optics Communications, vol. 95, NoS. 4–6, Jan. 15, 1993, pp 199–204.

R. Tepe, R. Gerhard–Multhaupt, W. Brinker and W, D. Molzow, "Viscoelastic Spatial Light Modulator with Active Matrix Addressing," Applied Optics, vol. 28, No. 22, New York, USA, pp.4826–4834, Nov. 15, 1989.

W. Brinker, R. Gerhard–Multhaupt, W, D. Molzow and R. Tepe,, "Deformation Behavior of Thin Viscoelastic Layers Used in an Active–Matrix–Addressed Spatial Light Modulator," SPIE vol. 1018, pp. 79–85, Germany, 1988.

T. Utsunomiya and H. Sato, "Electrically Deformable Echellette Grating and its Application to Tunable Laser Resonator," Electronics and Communications in Japan, vol. 63–c, No. 10, pp. 94–110, Japan, 1980.

C. Tew, L. Hornbeck, J. Lin, E. Chiu, K. Kornher, J. Conner, K. Komatsuzaki and P. Urbanus, "Electronic Control of a Digital Micromirror Device for Projection Displays," TAM 7.5, USA.

R. Apte, F. Sandejas, W. Banyai, D. Bloom, "Grating Light Valves For High Resolution Displays", Ginzton Laboratories, Stanford University, Stanford, CA 94305–4085, Jun., 1994, Report No. 5192.

R. Apte, et al. "Grating Light Valves For High Resolution Displays," Jun., 1994, Ginzton Laboratories, Stanford Univ., CA.

O. Solgaard, "Integrated Semiconductor Light Modulators For Fiber–Optic And Display Applications," Feb., 1992.

J. Neff, "Two–Dimensional Spatial Light Modulators: A Tutorial", Proceedings of the IEEE, vol. 78, No. 5, pp. 826–855, May, 1990.

Gerhard–Multhaupt, "Viscoelastic Spatial Light Modulators and Schlieren–Optical Systems for HDTV Projection Displays", SPIE vol. 1255 Large Screen Projection Displays II, pp. 69–78, 1990.

Gerhard–Multhaupt, "Light–Valve Technologies for High–Definition Television Projection Displays", vol. 12, No. 3/4, pp. 115–128, 1991.

Alvelda et al., "Ferroelectric Microdisplays Using Distortion–Compensated Pixel Layouts," SID 95 Digest, pp. 931–933, 1995.

Phillip Alvelda, "High–Efficiency Color Microdisplays," SID 95 Digest, pp. 307–311, 1995.

Worboys et al., "Miniature Display Technology for Integrated Helmut Systems," GEC Journal of Research, vol. 10, No. 2, pp. 111–118, 1993.

Farn et al., "Color Separation by use of Binary Optics," Optics Letters, vol. 18:15, pp. 1214–1216, 1993.

Phillip Alvelda, "VLSI Microdisplays and Optoelectric Technology," MIT, pp. 1–93, 1995.

Phillip Alvelda, "VLSI Microdisplay Technology," Oct. 14, 1994.

F. Sandejas, R. Apte, W. Banyai, D. Bloom, "Surface Microfabrication of Deformable Grating Light Valves For High Resolution Displays," The 7th International Conference on Solid–State Sensors and Actuators, pp. 6 & 7, (no date).

O.Solgaard, F. Sandejas, and D. Bloom, "Deformable Grating Optical Modulator," Optics letters, vol. 17, No. 9, New York, USA, pp. 688–690, May 1, 1992.

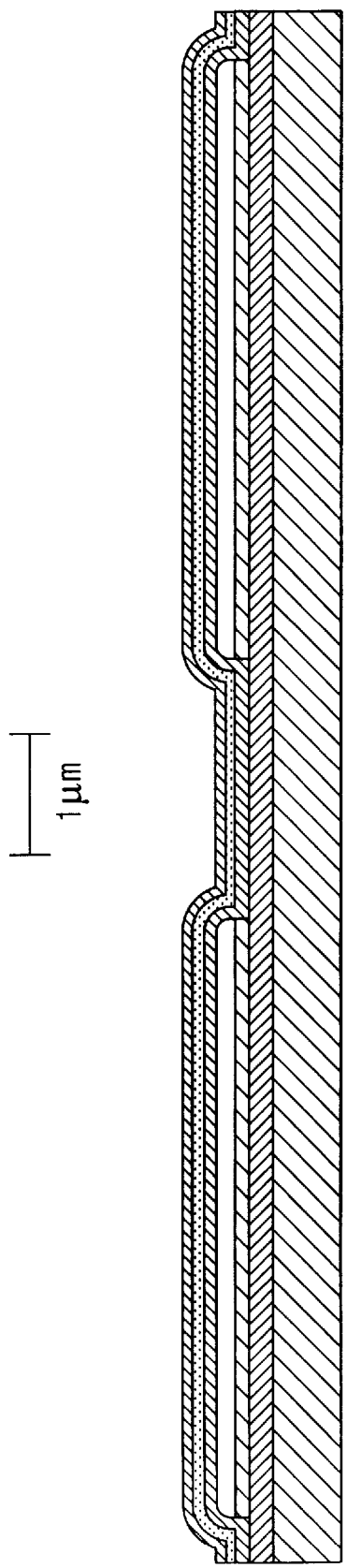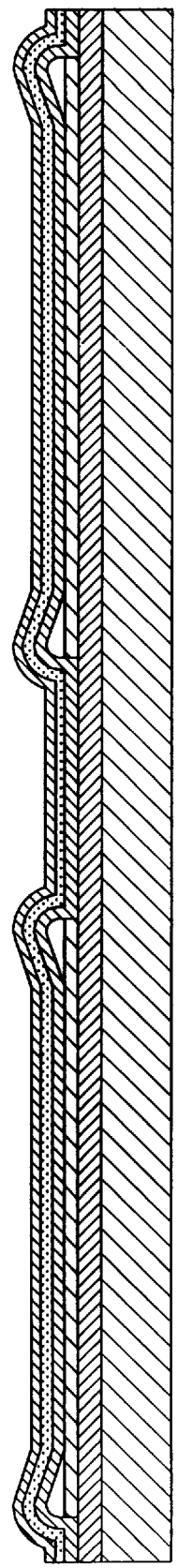
Fig. 4 NON-DIFFRACTING UP STATE PIXEL
Fig. 5 DIFFRACTIONG DOWN STATE PIXEL

ELECTRON GUN ACTIVATED GRATING LIGHT VALVE

FIELD OF THE INVENTION

This invention relates to the field of grating light valves wherein the grating light valves are formed of reflective ribbons manufactured adjacent one another wherein a portion of the ribbons are selectively deformable for selectively reflecting or diffracting light. More particularly, this invention relates to ribbons in a grating light valve which are deformable through selective impingement of an electron beam.

BACKGROUND OF THE INVENTION

Grating light valves are known as devices that can selectively diffract an incident beam of light. A variety of known grating light valves are discussed in the prior art and some others are or were commercially available. One grating light valve is described in U.S. Pat. No. 5,311,360. A similar grating light valve and a method of making it are described in two U.S. Patent applications, Ser. No. 08/482,188 entitled: FLAT DIFFRACTION GRATING LIGHT VALVE, now U.S. Pat. No. 5,841,579, issued Nov. 24, 1998, and Ser. No. 08/480,459 entitled: A METHOD OF MAKING AND AN APPARATUS FOR A FLAT DIFFRACTION GRATING LIGHT VALVE, now U.S. Pat. No. 5,661,592, issued Aug. 26, 1997, both filed on Jun. 7, 1995. These two patent applications are not admitted as prior art. Each of these three patent documents is incorporated herein by reference. The discussion that follows is in no way intended to modify or alter the scope of the teachings or claims of any of the above three captioned references. Rather, this discussion is intended only to schematically describe these references insofar as it will aid in understanding by providing bases for comparing or contrasting those technologies to the present invention.

According to the teachings of these three references, a diffraction grating light valve is formed of substantially parallel ribbon structures. The ribbons are formed over a semiconductor substrate using conventional semiconductor processing steps such as those used for forming integrated circuits. FIG. 1 shows the preferred grating light valve 10 from the U.S. Pat. No. 5,311,360. Each of the ribbons 18 have an upper surface coated with a reflective material 20, such as aluminum. In the spaces between the ribbons, the substrate 16 is also coated with the reflective material 24. The height difference between the reflective material 20 on the ribbons 18 and the reflective material 24 on the surface of the substrate 16 is ½ the wavelength λ of an expected beam of light. Because of this height difference, the beam of light reflects from the surface of the grating light valve essentially as if it were a specular mirror as shown in FIG. 2.

Upon applying a predetermined voltage potential across the ribbons 18 and the substrate 16, the ribbons 18 are caused to deflect downwards and contact the substrate 16. The grating light valve 10 is constructed so that the height difference in this deflected state is ¼ the wavelength λ of the expected beam of light. Because of this height difference, the beam of light is diffracted at the surface of the grating light valve essentially as shown in FIG. 3.

FIG. 4 shows a cross section view of two adjacent ribbons according to the technology taught in the two above captioned patent applications in an undeflected and reflecting state. According to the applications, in an undeflected state all the ribbons are in an up position. All the reflecting surfaces are on ribbons rather than having alternate ones of the reflectors mounted on the substrate as in U.S. Pat. No. 5,311,360. The ribbons are selectively deformable by coupling the ribbons to external control circuitry. When the ribbons for a single grating light valve are all in an up position, an essentially flat specular mirror is presented to an incident beam of light. The mirror is necessarily broken by the gaps between the ribbons of a single grating light valve structure.

FIG. 5 shows a cross section view of two adjacent ribbons according to another technology in a deflected and diffracting state. Alternate ones of the ribbons within a single grating light valve are selectively deformed and deflected into contact with the underlying substrate. When this occurs, the grating light valve diffracts the incident beam of light.

For both of the technologies described above, a voltage is coupled to the selected ribbon and to the substrate (or an appropriate conductor mounted on the substrate) for effecting the deflection of one or more ribbons. Though FIG. 6 is a graph schematically illustrating intensity versus voltage for both technologies described above, the graphs formed from empirical measurements from these two technologies are not identical. It will be understood that the light from the incident beam is collected from the diffracting angle away from the incident beam of light. Thus, no light is collected and accordingly there is no or low intensity when the ribbons are not deflected and thus the grating light valve is acting as a specular mirror. When the ribbons are deflected, the incident beam of light is diffracted to the collection point and the collected intensity is large.

Because the ribbons snap between completely up and completely down states, the intensity of the collected light is either fully "on" or fully "off". If a ribbon could be moved a partial distance between up and down, the light would diffract through another angle and the intensity of collected light could be varied accordingly. Unfortunately, partially moving a ribbon with the technologies taught by these three references is impractical as described below.

As is readily apparent from FIG. 6, there is hysteresis in the ribbons. As the voltage applied across the ribbons and substrate is increased, the intensity essentially does not change until a first threshhold voltage $V_D$ is reached. Then, the intensity increases very dramatically for a very small increase in voltage as the ribbons snap down to the substrate. The true empirical graphs are not vertical in this region but are very, very steep. Similarly, once the ribbons have snapped down, the intensity essentially does not change until a second threshhold voltage $V_U$ is reached. Then, the intensity decreases very dramatically for a very small decrease in voltage as the ribbons snap back to its up state. Again, the true empirical graphs are not vertical in this region but are very, very steep. The second threshhold voltage $V_U$ is lower than the first threshhold voltage $V_D$.

Theoretically, it is possible to move a ribbon only partway between an up and relaxed position to a down and deflected position. However, because of the very small changes in voltage that are required to account for such a change, it is difficult to control or effect such partial deflections. The problem is compounded because the electrical characteristics of a ribbon changes as it deflects. These electrical changes are due at least in part because the mechanical strain induced by deflecting the ribbons changes the electrical impedance of the ribbons. Also the capacitance of the ribbon-substrate system changes as the distance between the ribbons and the substrate changes. Additionally, because the ribbons are selectively deformable and because a plurality of ribbons are electrically coupled together for addressing, the capacitance changes are impossible to predict except on an imprecise statistical basis.

It would be desirable to provide a system that allows precise control of ribbon movement between fully up and fully down.

In an unrelated conventional display technology an electron gun is used to illuminate pixels, such as in commercial television and computer monitor displays. Such displays have been used for many years and the properties for controlling the electron beam are well known. However, because the illumination is developed by the electrons impinging on a display structure, the intensity of the display image is related to the beam power. Accordingly, systems of this type draw considerable power to develop a suitably intense display image. Reducing power consumption is generally considered a common goal of all system designers for a variety of reasons, including commercial, economic and environmental. It would be desirable to provide a display system that reduces the power consumption of the display without deteriorating the quality of the display.

Another unresolved problem with electron gun displays is a health related issue. It is as yet undetermined by the medical community whether a continual bombardment by electrons causes any health issues. The potential health problems due to the physical configuration of the display tube. The electron gun is mounted within a tube and is disposed away from the viewing surface (screen). The gun shoots electrons at the screen. As the electrons strike the structure of the screen, photons are excited and emitted for viewing. Some portion of the electrons will necessarily pass through the screen and travel beyond striking whatever object lies in its path. A person working each day at a computer monitor will be continually bombarded with electrons. It would be desirable to provide a display system that does not bombard a viewer with electrons.

SUMMARY OF THE INVENTION

A grating light valve is configured to either reflect or diffract an incident beam of light from a light source. Each grating light valve includes a plurality of deformable reflective ribbon structures. Preferably, the grating light valve is located within a vacuum chamber. A directable low power electron gun is also positioned within the chamber. To form an image the gun is scanned across an array of grating light valves and selectably irradiates predetermined ones of the ribbons to charge each such ribbon to a predetermined level. Depending upon the amount of charge so deposited onto the ribbon, it will deflect a predetermined distance toward an underlying substrate. The ribbons are preferably erased in one of two ways. According to the preferred embodiment, each ribbon includes a path of impedance to allow the charge to bleed into the substrate. The impedance is selected to discharge a fully charged ribbon in a period of a single frame. Alternatively, the electron gun can be used to generate high energy electrons. Upon impinging a ribbon a single high energy electron will cause the ribbon to emit more than one secondary electron. By applying a sufficient number of these high energy electrons, the charge on a ribbon can be removed.

BRIEF DESCRIPTION OF THE DRAWINGS

FIG. 4 shows a cross section view of two adjacent ribbons according to another technology in an undeflected and reflecting state.

FIG. 5 shows a cross section view of two adjacent ribbons according to another technology in a deflected and diffracting state.

DETAILED DESCRIPTION OF THE PREFERRED EMBODIMENT

Figure 1:
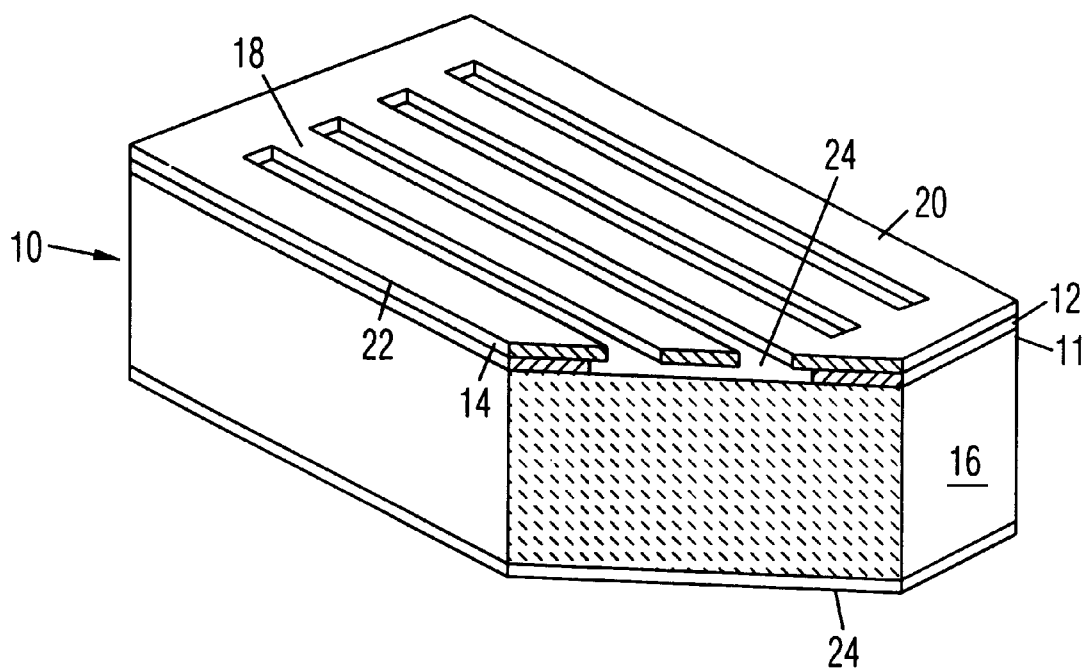
FIG. 1 shows a perspective view of a prior art grating light valve.
Figure 2:
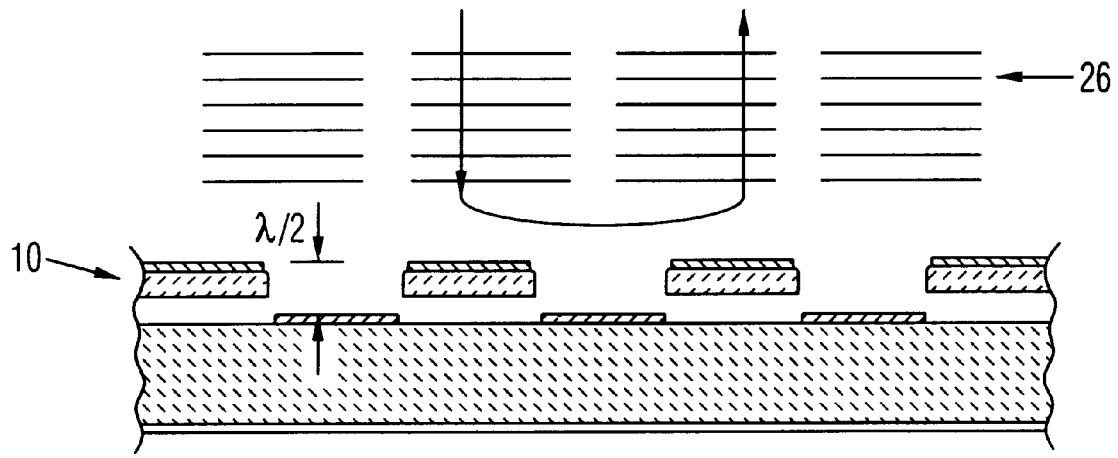
FIG. 2 shows a cross section view of the grating light valve of FIG. 1 in an undeflected and reflecting state.
Figure 3:
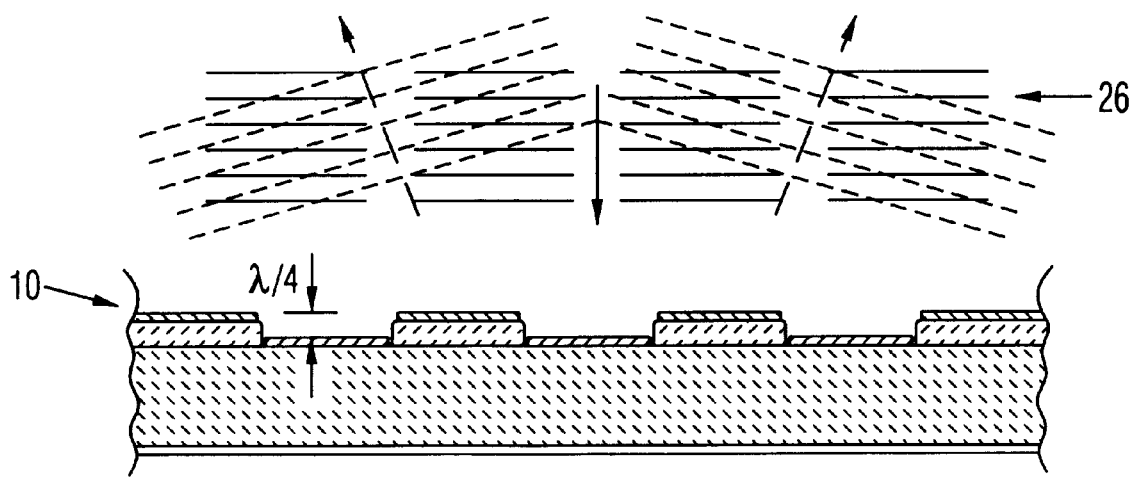
FIG. 3 shows a cross section view of the grating light valve of FIG. 1 in a deflected and diffracting state.
Figure 6:
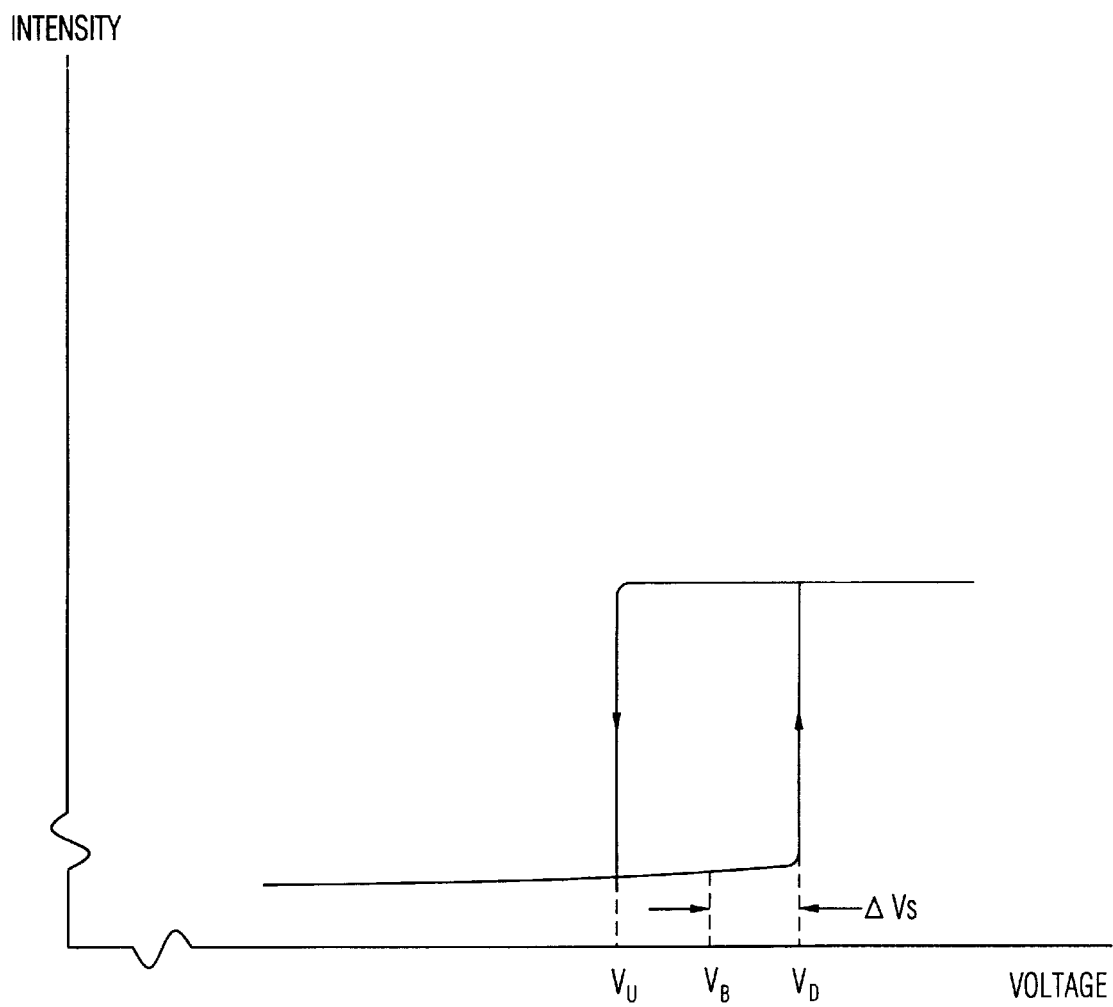
FIG. 6 is a graph schematically illustrating intensity versus voltage.
Figure 7:
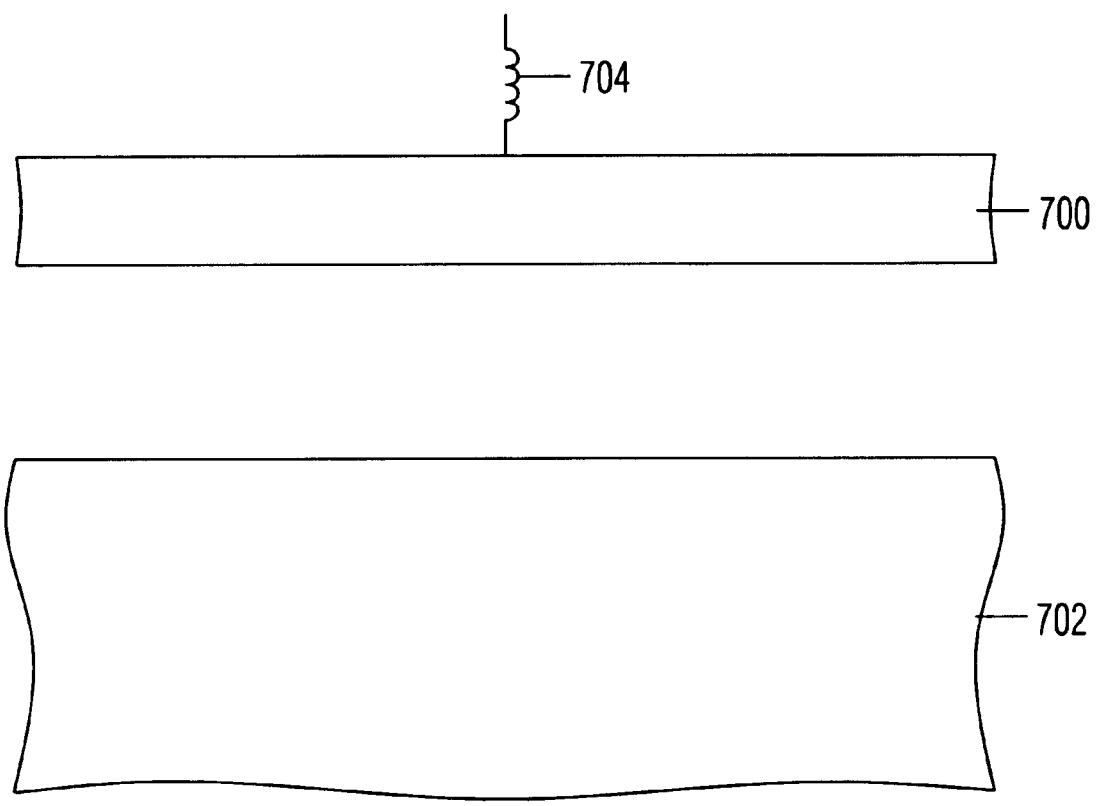
FIG. 7 shows a representational cross section diagram of a portion of a single ribbon and substrate.

FIG. 7 shows a representational diagram of a portion of a single ribbon 700 and a substrate 702. Consider that the ribbon 700 holds stored negative charge q (not voltage) and the substrate 702 is at a potential higher than the ribbon 700. The field between the ribbon 700 and the substrate 702 is independent of the spacing therebetween but is a function of the stored charge. The attractive force between the ribbon 702 and the substrate 702 is proportional to the electric field multiplied by the spacing.

The ribbon 700 is suspended at its ends and as it deflects is under tension. The strength of the restoring force can be considered as a spring constant −kx schematically shown as the spring 704. For any charge q there is a stable restoring force to which the ribbon will deflect to cancel the attractive force. In this way the ribbon 700 can be deflected to any desired height relative to the substrate 702. Thus, there is no "snap-in" behavior as found with a voltage driven technology such as described above. Using a technique of storing charge on a ribbon 700, the ribbon 700 can be moved arbitrarily close to the substrate 702.

Figure 8:
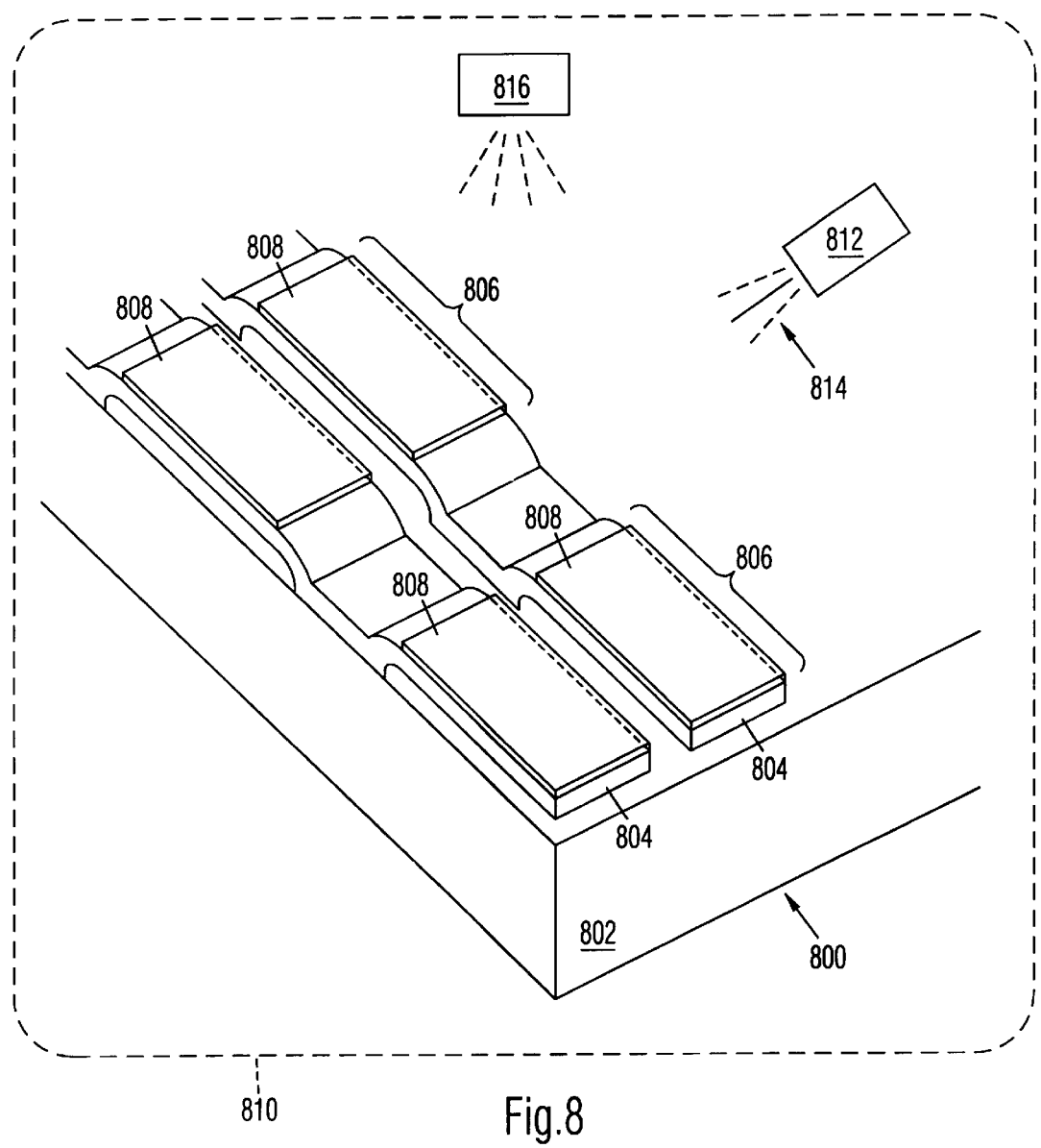
FIG. 8 shows a partial perspective and sectional grating light valve for inclusion in a display such as a television or computer monitor that is implemented using this technique of storing charge on a ribbon.

FIG. 8 shows a grating light valve for inclusion in a display such as a television or computer monitor that is implemented using this technique of storing charge on a ribbon. The grating light valve 800 is formed over a substrate 802 and includes a plurality of ribbons 804 which can be formed by any convenient means. In the embodiment shown, the ribbons 804 are formed of a continuous length of structure built over the substrate 802 using conventional semiconductor processing steps such as shown and described in detail in co-pending patent application Ser. No. 08/480,459 entitled: A METHOD OF MAKING AND AN APPARATUS FOR A FLAT DIFFRACTION GRATING LIGHT VALVE, now U.S. Pat. No. 5,661,592, issued Aug. 26, 1997, filed on Jun. 7, 1995 and incorporated herein by reference.

Each ribbon 804 is electrically coupled to the substrate 802 and is formed to have a predetermined high impedance as described below. All suspended portions 806 of each ribbon 804 are coated with a light reflective material structure 808 such as aluminum. Each of the reflective material structures 808 are electrically isolated from one another but are electrically coupled to the high impedance ribbon 804. In this way no on chip wiring or integrated control signals are required. Rather, the display can be formed using analog control signals for controlling the electron gun 812 (described below). This is an advantage over a digital approach for television because most television signals are analog and this approach avoids the necessity of converting such signals to digital signals.

The grating light valve is preferably mounted within a vacuum chamber 810. A low power electron gun and its associated control coils 812 are mounted within the chamber to generate an electron beam 814 and selectively impinges electrons onto predetermined ones of the reflective material structures 808. The gun is directed toward the grating light valve. Preferably, the gun is pointed away from or orthogonal to the displayed image so that no electrons are directed toward the viewer.

A light source is configured to shine a beam of incident light onto an array of the grating light valves 800. The light source can be selected to be as bright as necessary to achieve the desired image intensity. Collecting optics will receive only the light that is diffracted by the grating light valves to form an image for display. The light that is reflected by the grating light valve is discarded. The light will only be diffracted where the reflective material structures 808 were impinged by the electron beam 814. Preferably the light source is mounted outside the vacuum chamber to allow replacement when necessary. Transmission optics can be included, eg,. turning mirrors, lenses and the like. The transmission optics and the collecting optics can be within, without or both of the vacuum chamber as desired. (It will be apparent to one of ordinary skill in the art that the optical system can be configured to collect the light that is reflected and to block the light that is diffracted. To avoid obscuring the invention in unnecessary detail, only the system that collects diffracted light will be discussed, hereafter.)

The techniques for adjusting an electron beam are well known. Thus, one can readily direct the beam to impinge on each reflective material structures 808 separately and to place only a desired amount of charge onto each appropriate structure. This will deflect each ribbon 804 a desired amount and form an image of varying intensity (gray scale) as desired.

Figure 9:
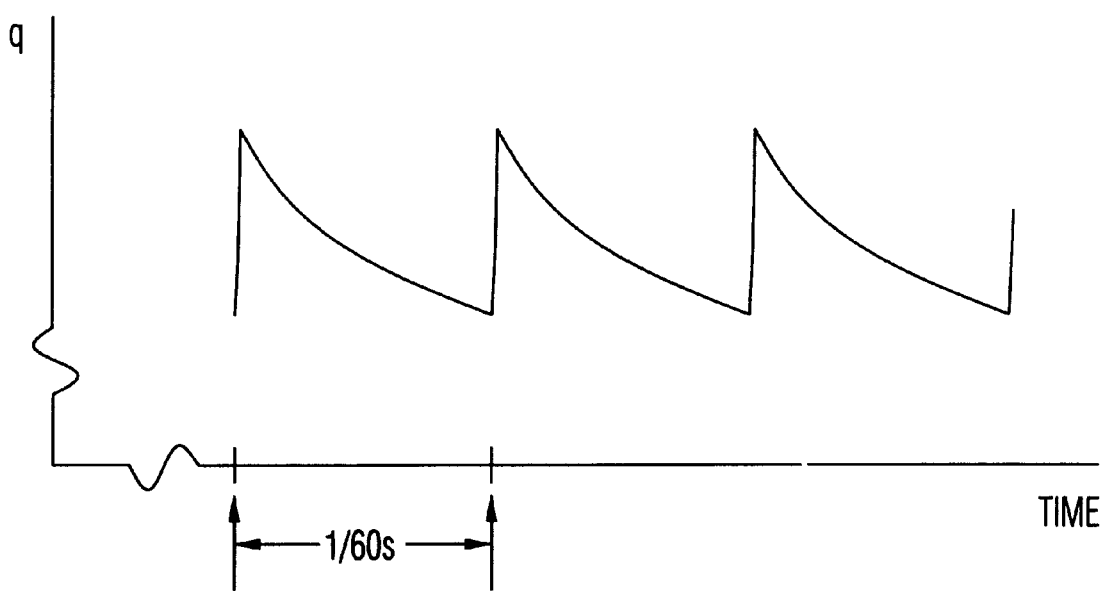
FIG. 9 shows a timing diagram of charge on a reflective material structures 808 versus time.

If an electron impinges onto one of the reflective material structures 808 the charge will be temporarily trapped on the reflective material structures 808 because of the high impedance of the ribbon 804. However, the charge will eventually bleed off the reflective material structures 808 through the ribbon 804 and into the substrate. For use in a display for a conventional application such as television, the frame is written sixty times per second. FIG. 9 shows a timing diagram of charge on a reflective material structures 808 versus time. In this example, the electron gun 812 (FIG. 8) scans the entire array of the grating light valve in 1/60 of a second. Presumably, the charge is placed onto the reflective material structures 808 almost instantaneously. The impedance of the ribbon 804 is set so the charge bleeds off exponentially before the next frame is drawn. The brightness "seen" by the viewer is the average brightness during the period for a frame and is proportional to the peak brightness. In this way if a pixel is intended to be bright in one frame and dark the next, the charge is gone from the ribbons so the pixel can appropriately respond. There are design considerations to be taken into account. Intensity is lost as the charge dissipates and the ribbons relax because the diffraction angle changes.

If one sufficiently high energy electron impinges onto the reflective material structures 808, more than one secondary electron will be ejected from the surface of the reflective material structures 808. In an alternate embodiment, the electron gun can be configured to periodically provide a high energy electron beam. This high energy beam can be used to "erase" charge stored on the reflective material structures 808. Thus, the electron gun 812 first impinges low energy electrons onto the reflective material structures 808 to store charge and form an image and then impinges high energy electrons onto the reflective material structures 808 to erase the image in preparation for drawing the next frame. Alternatively, a second high energy electron gun 816 (FIG. 8) can be mounted within the vacuum chamber 810 for the erase operation. The second electron gun 816 can be configured to provide a wide disbursement electron beam to erase the entire grating light valve array simultaneously.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A grating light valve comprising:
    a. a substrate;
    b. an array of ribbon structures, each ribbon comprising an elongated member having a first impedance;
    c. a support structure for holding the ribbons in a substantially parallel orientation suspended above the substrate, thereby forming a suspended portion of each ribbon; and
    d. a reflective material having a second impedance that is more conductive than the first impedance, wherein the reflective material is coated upon the suspended portion of each ribbon and wherein the reflective material of each suspended portion is electrically isolated from the reflective material of all other suspended portions;
   wherein the ribbons will deflect toward the substrate when an electric charge is applied to the reflective material.

2. The grating light valve according to claim 1 wherein the first impedance is configured that the electric charge stored on the reflective material will dissipate within a predetermined time.

3. The grating light valve according to claim 2 wherein the reflective material is electrically coupled to the substrate such that the charge stored on the reflective material will dissipate into the substrate.

4. The grating light valve according to claim 3 further comprising an electron gun for directing the electric charge onto the reflective material of predetermined ones of the ribbons.

5. The grating light valve according to claim 4 further comprising a vacuum chamber for housing the grating light valve and the electron gun.

6. The grating light valve according to claim 5 further comprising a light source for impinging an incident beam of light onto the grating light valve and light collecting optics for receiving light which is diffracted from the grating light valve.

7. The grating light valve according to claim 5 further comprising a light source for impinging an incident beam of light onto the grating light valve and light collecting optics for receiving light which is reflected from the grating light valve.

8. The grating light valve according to claim 1 wherein the first impedance is an insulator.

9. The grating light valve according to claim 8 further comprising an electron gun for directing charge onto the reflective material of predetermined ones of the ribbons.

10. The grating light valve according to claim 9 wherein the electron gun generates an electron beam and directs it to the reflective material of the predetermined ones of the ribbons, wherein the electron beam is of sufficient energy to cause secondary electron emissions from the reflective material so that any charge stored thereon is dissipated.

11. The grating light valve according to claim 10 further comprising a vacuum chamber for housing the grating light valve and the electron gun.

12. The grating light valve according to claim 11 further comprising a light source for impinging an incident beam of light onto the grating light valve and light collecting optics for receiving light which is diffracted from the grating light valve.

13. The grating light valve according to claim 11 further comprising a light source for impinging an incident beam of light onto the grating light valve and light collecting optics for receiving light which is reflected from the grating light valve.

14. The grating light valve according claim 1 wherein the ribbons are configured for each deflecting into a selective one of a plurality of parallel positions from an upright, relaxed position and wherein the selective one of the plurality of parallel positions is based on a value of the electric charge applied to the reflective material.

15. A display system comprising:
   a. a vacuum chamber;
   b. a grating light valve mounted within the vacuum chamber, the grating light valve comprising:
      (1) a substrate;
      (2) an array of ribbon structures, each ribbon comprising an elongated member having a first impedance;
      (3) a support structure for holding the ribbons in a substantially parallel orientation suspended above the substrate, thereby forming a suspended portion of each ribbon; and
      (4) a reflective material having a second impedance that is more conductive than the first impedance, wherein the reflective material is coated upon the suspended portion of each ribbon and wherein the reflective material of the suspended portion of each ribbon is electrically isolated from the reflective material of all other suspended portions, wherein the ribbons will deflect toward the substrate when an electric charge is applied to the reflective material;
   c. an electron gun mounted within the vacuum chamber for directing charge onto the reflective material of predetermined ones of the ribbons; and
   d. a light source for impinging an incident beam of light onto the grating light valve and light collecting optics for receiving light from the grating light valve.

16. The display system according to claim 15 further comprising a display screen for receiving light from the grating light valve and displaying an image, wherein the charge from the electron gun is directed away from the display screen.

17. A method of forming a display image comprising the steps of:
   a. providing an array of ribbon structures, each ribbon comprising an elongated member having a first impedance;
   b. supporting the ribbons in a substantially parallel orientation suspended above a substrate, thereby forming a suspended portion of each ribbon;
   c. coating the suspended portion of each ribbon with a reflective material having a second impedance that is more conductive that the first impedance wherein the reflective material of the suspended portion of each ribbon is electrically isolated from the reflective material of all other suspended portions: and
   d. selectively applying an electric charge to the reflective material of predetermined ones of the ribbons.

18. The method according to claim 17 further comprising steps of:
   a. deflecting the predetermined ones of the ribbons toward the substrate;
   b. impinging an incident light beam onto the ribbons;
   c. collecting light reflected from the ribbons; and
   d. forming the display image on a display screen from the light reflected from the ribbons, wherein the step of selectively applying the electric charge further comprises directing the electric charge away from the display screen.

19. The method according to claim 17 further comprising steps of:
   a. deflecting the predetermined ones of the ribbons toward the substrate;
   b. impinging an incident light beam onto the ribbons;
   c. collecting light diffracted from the ribbons; and
   d. forming the display image on a display screen from the light diffracted from the ribbons, wherein the step of selectively applying the electric charge further comprises directing the electric charge away from the display screen.

* * * * *

UNITED STATES PATENT AND TRADEMARK OFFICE
CERTIFICATE OF CORRECTION

PATENT NO. : 6,130,770
DATED : October 10, 2000
INVENTOR(S) : David M. Bloom

Page 1 of 2

It is certified that error appears in the above-identified patent and that said Letters Patent is hereby corrected as shown below:

On the title page: Item [56]

IN THE REFERENCES CITED [56]

The following U.S. Patent Documents need to be added:

-- 3,743,507   7/1973   Ih et al.   96/81
4,034,211   7/1977   Horst et al.   235/61.12N
4,641,193   2/1987   Glenn   358/233
5,151,724   9/1992   Kikinis   357/17
5,493,439   2/1996   Engle   359/292
5,704,700   1/1998   Kappel et al.   353/31
5,742,373   4/1998   Alveda   349/204
5,949,570   9/1999   Shiono et al.   359/291 --.

UNITED STATES PATENT AND TRADEMARK OFFICE
CERTIFICATE OF CORRECTION

PATENT NO. : 6,130,770

DATED : October 10, 2000

INVENTOR(S) : David M. Bloom

Page 2 of 2

It is certified that error appears in the above-identified patent and that said Letters Patent is hereby corrected as shown below:

The following Foreign Patent Documents need to be added:

--     0 477 566 A2     4/1992     European Pat. Off.     G02B   26/08
       WO 96/08031      3/1996     PCT                   H01J    29/12--.

The following Other Publications need to be added:

--     Rowe, D.P. et al., "Laser Beam Scanning," SPIE, Vol. 2088, Oct. 5, 1993, pp 18-26.
Hornbeck, L.J., "Deformable-Mirror Spatial Light Modulators," Spatial Light Modulators and Applications III, Aug. 8, 1989, pp 86-102.--.

Signed and Sealed this

Twenty-fourth Day of April, 2001

Attest:

NICHOLAS P. GODICI

Attesting Officer      Acting Director of the United States Patent and Trademark Office